United States Patent Office 2,722,493
Patented Nov. 1, 1955

2,722,493
INSULATED ELECTRICAL CONDUCTOR

William H. Markwood, Jr., Wilmington, Del., and George M. Taylor, Kennett Square, Pa., assignors to Hercules Powder Company, Wilmington, Del., a corporation of Delaware No Drawing. Application August 17, 1954,
Serial No. 450,550

9 Claims. (Cl. 117—232)

This invention relates to new insulated electrical conductors and, more particularly, to electrical conductors insulated with a coating of a polymer of 3,3-bis(chloromethyl)oxetane.

Various materials have been utilized in the past for coating and insulating electrical conductors. Among the more commonly used coatings which may be mentioned are the conventional enamel or oleoresinous varnish-type coatings, natural or synthetic rubbers, polyvinyl resins, polystyrene resins, etc. All of these coating compositions have been found to be lacking in one respect or another. For example, the enamel or varnish coatings lack adequate flexibility. The rubber coatings are not sufficiently resistant to the action of organic solvents with which such wire is frequently in contact, as in refrigeration units, etc. Furthermore, the rubber coatings deteriorate with age and exposure to the atmosphere, resulting in the cracking and peeling of the rubber coating. The polyvinyl and polystyrene resin coatings must be plasticized in order to have sufficient flexibility and consequently are subject to attack by organic solvents. Even if not exposed to solvents, the plasticizers being relatively volatile are lost on aging and these coatings then become brittle. Hence these materials are not completely satisfactory for electrical insulation.

Now, in accordance with this invention, it has been found that insulated electrical conductors having excellent dielectric properties coupled with freedom from brittleness may be prepared by coating the electrical conductor with a high molecular weight polymer of 3,3-bis(chloromethyl)oxetane. These insulated electrical conductors have many outstanding properties in addition to flexibility and nonbrittleness. No plasticizer is required for these polymers and so there is no problem of extraction by solvents or loss by volatility of plasticizer. Another advantage when polymers of 3,3-bis(chloromethyl)oxetane are used as the coating for electrical conductors in accordance with this invention is that the coating is not attacked by most organic solvents including gasoline and grease. Hence, wire insulated in accordance with this invention may be used in many applications where other insulated electrical conductors cannot be used.

Any high molecular weight polymer of 3,3-bis(chloromethyl)oxetane may be used for the preparation of the insulated electrical conductors of this invention. In general, polymers having a molecular weight of about 25,000 or a specific viscosity of at least about 0.3 when measured as a 1% solution in cyclohexanone at 50° C., will be used. Preferably the polymer will have a specific viscosity of at least about 0.5 and more preferably from about 0.8 to about 3 or above, when measured as a 1% solution in cyclohexanone at 50° C.

The 3,3-bis(chloromethyl)oxetane polymers having molecular weights of 25,000 and above or a specific viscosity of about 0.3, when measured as a 1% solution in cyclohexanone at 50° C., may be prepared by contacting 3,3-bis(chloromethyl)oxetane with boron trifluoride or its molecular complexes. The polymerization reaction may be carried out in the presence of an inert organic liquid diluent. Any inert organic solvent may be used as the diluent for the polymerization. However, highly polar organic solvents such as dioxane, etc., are preferably not used since they retard the polymerization by inactivating the catalyst. In addition, inorganic solvents such as liquid sulfur dioxide may also be used. The solvent should, of course, not be one which will cause chain termination since such a solvent, as, for example, an alcohol, would not then be inert. Exemplary of the solvents which may be used for carrying out the polymerization of 3,3-bis(chloromethyl)oxetane are the hydrocarbon solvents such as n-hexane, cyclohexane, benzene, toluene, etc., chlorinated solvents such as methylene chloride, chloroform, carbon tetrachloride, dichlorobenzene, etc., and nitroalkanes such as nitromethane, etc. The catalyst may be added directly to the solution of 3,3-bis(chloromethyl)oxetane in inert diluent or it may be added as a solution, if desired. The amount of catalyst which is added to the monomer may vary over a wide range but usually from about 0.01% to about 10% is adequate and preferably an amount of from about 0.1% to about 4%, based on the monomer, will be used. The amount of catalyst will, of course, vary with the type of polymerization reaction.

The temperature at which the polymerization at 3,3-bis(chloromethyl)oxetane is carried out may vary over a wide range. In general, the molecular weight of the polymer produced increases with a decrease in temperature. Hence, for the production of higher molecular weight polymers, the temperature should be held below about 80° C. In general, the polymerization reaction will be carried out, by selection of appropriate solvent, etc., at a temperature within the range of from about —80° C. to about 80° C., preferably at a temperature below about 30° C. and more preferably at a temperature below about 20° C. Although the reaction mixture may turn solid very quickly, higher conversions may be obtained by allowing it to "cure" for several hours, the polymerization continuing in what is apparently a solid phase. The polymerization reaction may, of course, be performed in a batchwise manner or as a continuous reaction.

The manner in which the polymer is isolated will depend upon the type of polymerization system used. For example, if a large amount of solvent was used as a diluent, the polymer may be separated simply by filtration. Otherwise, it is readily isolated by treating the reaction mixture with a liquid in which the polymer is insoluble but which will destroy the catalyst which was used for the polymerization reaction. Alcohols such as methanol, ethanol, isopropanol, etc., are suitable for this purpose. The polymer then may be separated by filtration.

Polymers of 3,3-bis(chloromethyl)oxetane of any desired molecular weight may be prepared by the proper selection of the polymerization reaction conditions, as, for example, control of temperature, purity of the monomer, etc. Another method of modifying the properties of the 3,3-bis(chloromethyl)oxetane polymer is by the incorporation of a copolymerizable monomer in the polymerization process to produce a copolymer. By this means it is possible to raise or lower the melting point of the polymer, increase its flexibility, etc. Exemplary of the copolymers that may be used are the copolymers of 3,3-bis(chloromethyl)oxetane with other 3,3-disubstituted oxetanes such as 3,3-bis(fluoromethyl)oxetane, 3,3-bis(bromomethyl)oxetane, 3 - chloromethyl-3-methyloxetane, 3,3-dimethyloxetane, etc., or other copolymerizable monomers such as oxetane itself or other substituted oxetanes.

The following examples will illustrate the preparation of the polymers of 3,3-bis(chloromethyl)oxetane from which the insulated electrical conductors of this invention are formed. All parts and percentages are by weight unless otherwise indicated.

*Example 1*

A solution of 1 part of 3,3-bis(chloromethyl)oxetane in 2 parts of chloroform was cooled to —35° C. and held at that temperature while a slow stream of nitrogen was passed through it, boron trifluoride being bled into the nitrogen stream at such a rate that the temperature elevation was maintained within one to two degrees. Within ½ hour the reaction mixture had become so viscous that it could no longer be stirred. It was then allowed to stand at —35° C. for 2 hours, after which the polymer was recovered by agitating the reaction mixture with methanol and filtering. The polymer was washed with methanol and dried in vacuo at 60° C. The white solid product so obtained had a softening point of 165–170° C. The specific viscosity of a 1% solution of it in cyclohexanone was 0.702 which corresponds to a molecular weight of about 42,000.

*Example 2*

The above example was repeated except that methylene chloride was used in place of chloroform and the temperature was held at —50° C. throughout the polymerization. The polymer so obtained had a softening point of about 165–170° C. and an intrinsic viscosity of of 1.05 which is equivalent to a molecular weight of about 60,000 to 100,000.

*Example 3*

A solution of 1 part of 3,3-bis(chloromethyl)oxetane in 2 parts of methylene chloride was cooled to —50° C. and held at that temperature while a slow stream of nitrogen was passed through it, boron trifluoride being bled into the nitrogen stream at such a rate as to maintain the temperature within one or two degrees. The total amount of boron trifluoride used was 0.7% based on the weight of the monomer. At the end of 4 hours, the polymer was isolated as described in the above examples. The specific viscosity of a 1% solution of this polymer in cyclohexanone at 50° C. was 1.6.

*Example 4*

A solution of 1 part of a freshly distilled 3,3-bis (chloromethyl)oxetane in 2 parts of methylene chloride was cooled to about —45° C. Boron trifluoride was bled into this solution as described in the foregoing examples until an amount of about 2.0% of boron trifluoride based on the weight of the monomer had been added. After 1½ hours the polymer was isolated. The conversion of monomer to polymer amounted to 74%. A 1% solution of this polymer in cyclohexanone at 50° C. had a specific viscosity of 2.3.

*Example 5*

A solution of 1 part of a carefully purified 3,3-bis (chloromethyl)oxetane in 2 parts of methylene chloride was cooled to —50° C. Boron trifluoride (1.0% based on the weight of the monomer) was then added as in the foregoing examples. After 1 hour the polymer was isolated. The specific viscosity of this polymer (1% solution in cyclohexanone at 50° C.) was 3.7.

*Example 6*

A slow stream of nitrogen was passed into an agitated solution of 117 parts of 3,3-bis(chloromethyl)oxetane and 12 parts of 3-chloromethyl-3-methyloxetane. After cooling to —30° C., 3.88 parts of gaseous boron trifluoride was introduced into the nitrogen stream. Polymerization was then allowed to proceed at that temperature for 4 hours, after which 300 parts of methanol was added. The polymer was removed by filtration, washed with methanol, and dried. It was a powder having a melting point of 152°–156° C. and a specific viscosity of 1.217 when measured as a 1% solution in cyclohexanone. It contained 43.6% chlorine.

*Example 7*

A slow stream of nitrogen was passed into a solution of 7.3 parts of dimethyloxetane and 95 parts of 3,3-bis (chloromethyl)oxetane in 210 parts of liquid sulfur dioxide and cooled to —30° C. Gaseous boron trifluoride, 3 parts, was then added and the polymerization was allowed to proceed at that temperature for 5 hours. Methanol, 300 parts, was then added and the polymer was separated by filtration, washed with methanol, and dried. It was a powder having a melting point of 159°–163° C. and a specific viscosity of 0.999 when measured as a 1% solution in cyclohexanone. It contained 42.0% chlorine.

In accordance with this invention, the polymers of 3,3-bis(chloromethyl)oxetane having specific viscosities, when measured as 1% solutions in cyclohexanone at 50° C., of at least about 0.3, preferably at least about 0.5, and more preferably from about 0.8 to about 3, may be used as the insulation for electrical conductors. In general, wire will be coated by extrusion coating of the electrical conductor with the polymer. However, in the preparation of some insulated electrical conductors, it may be desirable to use a solution of the polymer for applying the insulation and then evaporating the solvent. While the 3,3-bis(chloromethyl)oxetane polymers are insoluble in most organic solvents at room temperature, they are soluble when heated in highly oxygenated solvents such as cyclohexanone, isophorone, dioxane, and nitrobenzene and in solvents such as pyridine, o-dichlorobenzene, etc. Thus, a solution of the polymer having a sufficient viscosity for easy application as a coating may be used in those instances where extrusion coating of the electrical conductor is not applicable or practical.

In order to avoid degradation of the polymer which may occur during the coating of the electrical conductor, particularly in extrusion coating methods where the polymer may be held at high temperatures in the presence of air for long periods of time, it is frequently desirable to incorporate a stabilizer. If the electrical conductor is to be used in applications where it is exposed to ultraviolet light for long periods of time, it will also be desirable to add a stabilizer for the 3,3-bis(chloromethyl)-oxetane polymer. Some of these phenolic compounds or esters or ethers thereof are more effective as heat stabilizers while others are more effective as light stabilizers although in many instances the compound will act as both. It may, therefore, be desirable to use more than one of the phenolic stabilizers. While any phenol will exert some stabilization, the phenol will preferably contain at least one alkyl substituent having at least 4 carbon atoms, or aryl substituent, or aralkyl substituent. Exemplary of the highly substituted phenols, esters of phenols, and ethers of phenols that may be used as heat and/or light stabilizers for the polymers of 3,3-bis(chloromethyl)oxetane are the highly substituted phenols such as di-tert-butyl p-cresol, o,p-cresol, o,p-diamylphenol, o- and p-tert-amylphenol, p-octylphenol, benzoyl resorcinol (i. e., 2,4-dihydroxybenzophenone), p-cyclohexylphenol and the similarly substituted alkyl naphthols, 2,2-methylenebis (4-methyl-6-tert-butylphenol), 2,6-bis[(2 - hydroxy - 5 - methylphenyl)methyl] - p - cresol, p,p' - isopropylidenebisphenol, p,p' - sec - butylidenebisphenol, 4,4'-isopropylidene-bis-o-cresol, etc., resorcinol monobenzoate, hydroquinone monobenzoate, propyl gallate, the monobenzyl ether of hydroquinone, and the epoxy resins produced by the reaction of epichlorohydrin with various bisphenols such as p,p'-isopropylidenebisphenol, p,p'-sec-butylidenebisphenol, 4,4'-isopropylidene-bis-o-cresol, etc. The amount of such phenolic stabilizers incorporated in the polymer prior to coating the electrical insulator may be varied over a wide range but, in general, will be an amount of from about 0.1% to about 5% by weight of the polymer. More may be used by generally is not necessary.

For many applications of the insulated electrical conductors of this invention, it may be desirable to incorporate other additives in the coating composition, as, for example, fillers, pigments, etc. The fillers, pigments, etc., that may be incorporated should be selected from those whose electrical properties are such as will not impair the electrical properties of the insulated conductor. The amount of such additives included in the coating composition will, of course, depend upon the type of electrical conductor being insulated, etc. Obviously, many other modifications may be made of the coating compositions of this invention used for insulating electrical conductors.

The coating of the 3,3-bis(chloromethyl)oxetane polymer on the electrical conductor to produce the insulated conductors of this invention may be applied by any of the well-known methods of applying coatings to electrical conductors. In general, wire may be insulated by extruding the polymeric coating composition around the wire in any of the well-known types of machines suitable for this purpose. In such extrusion operations, the wire to be coated is fed through a heated die and the heated 3,3-bis(chloromethyl)oxetane polymer, or mixtures of polymer containing such additives as may be desirable, is caused to flow through the die and around the wire. The tubing technique of extrusion coating may also be used. The wire so coated is then quenched whereby the coating is affixed to the wire and no further operations are required to make the 3,3-bis(chloromethyl)oxetane polymer coating adhere to the wire. Thus the insulation coatings of this invention do not require the baking, annealing, etc., operations required by many coating compositions. Alternatively, wire may be coated by dipping or spraying the wire with a solution of the polymer, as, for example, in cyclohexanone followed by evaporation of the solvent. Obviously such a process is not as advantageous for coating wire as the extrusion coating method mentioned above. However, for some electrical conductors, it may be more desirable.

To demonstrate the excellent electrical properties of the 3,3-bis(chloromethyl)oxetane polymers for use in the preparation of the insulated electrical conductors of this invention, tests were made on an injection molded disc 1/8 inch thick prepared from a 3,3-bis(chloromethyl)-oxetane polymer having a specific viscosity of 1.7, when measured as a 1% solution in cyclohexanone at 50° C. and containing 0.5% by weight of 2,2-methylenebis(4-methyl-6-tert-butylphenol). It had a volume resistivity of $4 \times 10^{15}$ ohm-cm. and a dielectric strength in volts per mil of 400. The loss factor, dissipation factor, and dielectric constant at 60, $10^3$, and $10^6$ cycles per second were determined at 25.6° C. with the following results:

| Cycles | Loss Factor | Dissipation Factor | Dielectric Constant |
|---|---|---|---|
| 60 | 0.05 | 0.016 | 3.1 |
| $10^3$ | 0.03 | 0.008 | 3.1 |
| $10^6$ | 0.03 | 0.01 | 2.8 |

The following examples will illustrate the preparation of electric conductors insulated with the 3,3-bis(chloromethyl)oxetane polymer insulating compositions of this invention.

*Example 8*

Dry 3,3-bis(chloromethyl)oxetane polymer having a specific viscosity, when measured as a 1% solution in cyclohexanone at 50° C., of about 1.7 was extruded over #20 gauge copper wire using a 1-inch screw-type extruder with a crosshead wire coating die and then quenched. Coating of the desired thickness, in this case 3 to 4 mils, was obtained by controlling both the rate of wire travel through the die and the speed of the extruder screw. With a cylinder temperature of 220° C., a smooth, uniform, and transparent coating was obtained.

When a section of this coated wire was tied tightly into a knot, there was no evidence of either cracks in the coating or separation between wire and plastic. Toughness and flexibility of this plastic coating were demonstrated by repeated flexing of the coated wire. Under these conditions the wire broke before the plastic coating.

*Examples 9 and 10*

Example 8 was repeated using #18 gauge copper wire and #18 gauge nichrome wire except that the polymer contained 0.5% of 2,2-methylenebis(4-methyl-6-tert-butylphenol) as stabilizer. A smooth, uniform, tough and flexible coating was obtained in each case.

This application is a continuation-in-part of our application Serial No. 367,715, filed July 13, 1953, now abandoned.

What we claim and desire to protect by Letters Patent is:

1. As a new article of manufacture, an insulated electrical conductor having in combination wire coated with a tough and flexible plastic coating essentially comprising a polymer of the group consisting of homopolymers of 3,3-bis(chloromethyl)oxetane, copolymers of 3,3-bis(chloromethyl)oxetane with other 3,3 - disubstituted oxetanes, copolymers of 3,3-bis(chloromethyl)oxetane with oxetane itself, and copolymers of 3,3-bis(chloromethyl)oxetane with other substituted oxetanes, and said polymer having a specific viscosity of at least about 0.3, when measured as a 1% solution in cyclohexanone at 50° C.

2. As a new article of manufacture, an insulated electrical conductor having in combination wire coated with a tough and flexible plastic coating essentially comprising a homopolymer of 3,3-bis(chloromethyl)oxetane, and said homopolymer having a specific viscosity of from about 0.8 to about 3, when measured as a 1% solution in cyclohexanone at 50° C.

3. The article of claim 2 in which the plastic coating contains a stabilizer in an amount from about 0.1 to about 5% by weight of the homopolymer.

4. As a new article of manufacture, an insulated electrical conductor having in combination wire coated with a tough and flexible plastic coating essentially comprising a copolymer of 3,3-bis(chloromethyl)oxetane with another 3,3-disubstituted oxetane, and said copolymer having a specific viscosity of from about 0.8 to about 3, when measured as a 1% solution in cyclohexanone at 50° C.

5. The article of claim 4 in which the plastic coating contains a stabilizer in an amount of from about 0.1 to about 5% by weight of the copolymer.

6. As a new article of manufacture, an insulated electrical conductor having in combination wire coated with a tough and flexible plastic coating essentially comprising a copolymer of 3,3 - bis(chloromethyl)oxetane with oxetane itself, and said copolymer having a specific viscosity of from about 0.8 to about 3, when measured as a 1% solution in cyclohexanone at 50° C.

7. The article of claim 6 in which the plastic coating contains a stabilizer in an amount of from about 0.1 to about 5% by weight of the copolymer.

8. As a new article of manufacture, an insulated electrical conductor having in combination wire coated with a tough and flexible plastic coating essentially comprising a copolymer of 3,3-bis(chloromethyl)oxetane with another substituted oxetane, and said copolymer having a specific viscosity of from about 0.8 to about 3, when measured as a 1% solution in cyclohexanone at 50° C.

9. The article of claim 8 in which the plastic coating contains a stabilizer in an amount of from about 0.1 to about 5% by weight of the copolymer.

References Cited in the file of this patent

UNITED STATES PATENTS

| | | |
|---|---|---|
| 2,455,912 | Cairns et al. | Dec. 14, 1948 |
| 2,462,048 | Wyler | Feb. 15, 1949 |
| 2,660,563 | Banes et al. | Nov. 24, 1953 |
| 2,684,353 | Greenspan et al. | July 24, 1954 |